United States Patent
Gazdik et al.

(10) Patent No.: US 6,847,466 B1
(45) Date of Patent: Jan. 25, 2005

(54) PRINTING METHOD

(75) Inventors: Charles J. Gazdik, Boise, ID (US);
Shell S. Simpson, Boise, ID (US);
Lainye E. Reich, Vancouver, WA (US);
David Hall, Vancouver, WA (US);
Sherri L. Brown, Clackamas, OR (US); Steve Claus, Canby, OR (US);
Raghothama S. Cauligi, Vancouver, WA (US); Donald J. Welch, Vancouver, WA (US); Erik D. Ness, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/561,187

(22) Filed: Apr. 27, 2000

(51) Int. Cl.[7] .............................................. G06F 15/00
(52) U.S. Cl. ..................................... 358/1.15; 358/1.13
(58) Field of Search ................................. 358/1.1, 1.12, 358/1.13, 1.15; 707/104, 104.1, 103 R, 100, 102, 328; 709/328

(56) References Cited

U.S. PATENT DOCUMENTS

| | | | | |
|---|---|---|---|---|
| 5,602,974 A | * | 2/1997 | Shaw et al. | 358/1.15 |
| 5,604,843 A | * | 2/1997 | Shaw et al. | 358/1.1 |
| 5,995,723 A | * | 11/1999 | Sperry et al. | 358/1.13 |
| 6,081,812 A | * | 6/2000 | Boggs et al. | 707/202 |
| 6,260,044 B1 | * | 7/2001 | Nagral et al. | 358/1.13 |
| 6,268,924 B1 | * | 7/2001 | Koppolu et al. | 358/1.13 |
| 6,296,191 B1 | * | 10/2001 | Hamann et al. | 235/492 |
| 6,327,051 B1 | * | 12/2001 | Moro et al. | 358/1.15 |
| 6,369,909 B1 | * | 4/2002 | Shima | 358/1.13 |
| 2003/0038964 A1 | * | 2/2003 | Ferlitsch | 358/1.15 |

FOREIGN PATENT DOCUMENTS

GB     2355826     5/2001

OTHER PUBLICATIONS

Microsoft Knowledge Base Article (Article No. 167345) located at www.microsoft.com.*
United Kingdom Search Report, Feb. 11, 2002.

* cited by examiner

*Primary Examiner*—Mark Wallerson

(57) ABSTRACT

A method for use in printing a print job from an application program on a printer. The printer has associated job settings which include a private portion containing a printer-specific job setting. The method includes providing a program interface configured to enable the application program to access the printer-specific job setting. The method also typically includes, from the application program, sending a command to the program interface to perform an operation related to the printer-specific job setting, and performing the operation related to the printer-specific job setting.

21 Claims, 8 Drawing Sheets

Fig. 5

- 102: RETRIEVE DEVMODE FOR SELECTED PRINTER, THE DEVMODE HAVING A PUBLIC PORTION, A PRIVATE PORTION, AND A COMMAND BUFFER LOCATED WITHING THE PRIVATE PORTION
- 104: QUERY PRINTER DATA TO DETERMINE IF SELECTED PRINTER SUPPORTS ACCESS TO PRIVATE PORTION OF DEVMODE — NO → 120; YES ↓
- 106: RETRIEVE FROM PRINTER DATA A COMMAND BUFFER OFFSET
- 108: RETRIEVE THE SIZE OF THE PUBLIC PORTION OF THE DEVMODE
- 110: CALCULATE THE ADDRESS OF THE COMMAND BUFFER WITHIN THE PRIVATE PORTION OF THE DEVMODE
- 112: VERIFY THE VALIDITY OF THE COMMAND BUFFER ADDRESS BY CHECKING SIGNATURE OF COMMAND BUFFER
- 114: SET THE COMMAND BUFFER TO INDICATE A PREDETERMINED COMMAND
- 116: SEND DEVMODE WITH COMMAND TO PRINTER DRIVER
- 118: EXECUTE COMMAND
- 120: CONTINUE

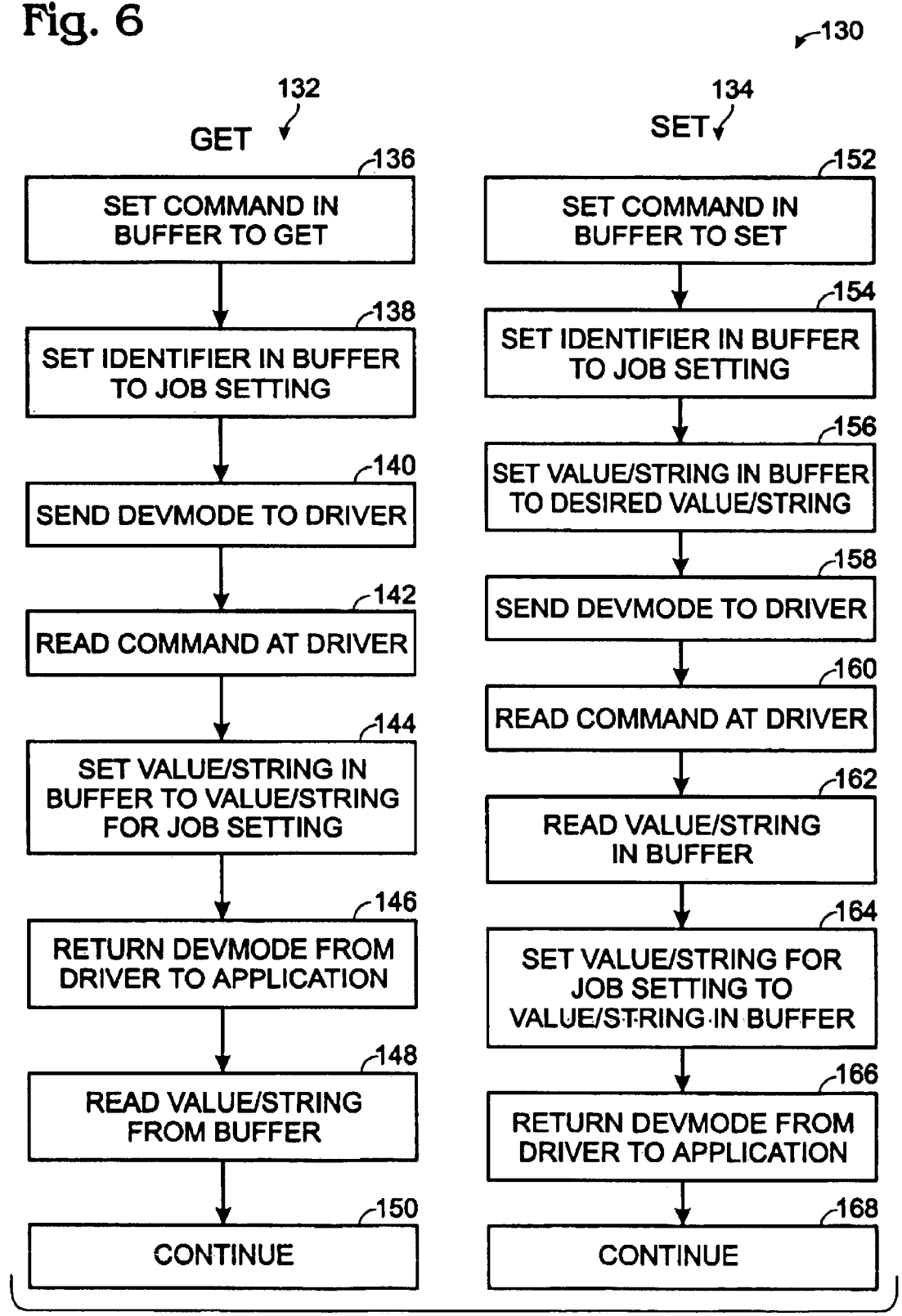

PRINTING METHOD

TECHNICAL FIELD

This invention relates generally to computer systems, and more particularly to a printing method for a computer system.

BACKGROUND ART

A printer driver is a configurable translator that translates a print job received from the operating system of a computer into a set of instructions that a selected printer can understand. To print a document from an application program running on the computer, the application program typically sends a print job, via the operating system of the computer, to the printer driver. The printer driver, in turn, translates the print job into a set of instructions that the selected printer can understand, and transmits these instructions to the printer for execution. The printer driver utilizes two categories of settings to generate the set of instructions for the selected printer, namely printer settings and job settings. Printer settings generally inform the driver of the hardware configuration of the printer, and job settings generally inform the driver of the configuration for the present job. For example, a printer setting might be used to indicate that a duplexer is installed on a printer, while a job setting might determine whether the duplexer should be used on a current print job.

The WINDOWS family of operating systems available from Microsoft Corporation of Redmond, Wash. uses a data structure known as "DEVMODE," to store job settings for each print job. DEVMODE includes a public portion having standardized printer-independent contents defined by Microsoft, and a private portion including printer-specific settings. The content of the public portion is accessible by application programs running in the WINDOWS operating environment. The private portion of the DEVMODE is not standardized, and not accessible by application programs. Only the printer driver can access the private portion of the DEVMODE. Therefore, the user can only adjust the private DEVMODE settings, through a print properties dialog box that is created by the print driver.

The inability of application-programs to directly access job settings stored in the private portion of the DEVMODE is problematic because the application program cannot use the printer-specific job settings in a programmatic manner. Rather, the application can only offer the user the ability to enter a printer driver initiated print dialog box to alter the printer-specific job settings on a per-print-job basis. Thus, application programs are not currently able to take fill advantage of the many printer-specific features available on modern printers.

SUMMARY OF THE INVENTION

A method for use in printing a print job from an application program on a printer is provided. The printer has associated job settings which include a private portion containing a printer-specific job setting. The method includes providing a program interface configured to enable the application program to access the printer specific job setting. The method also typically includes, from the application program, sending a command to the program interface to perform an operation related to the printer-specific job setting, and performing the operation related to the printer-specific job setting.

BRIEF DESCRIPTION OF THE DRAWINGS

FIG. 5 is a flowchart of a method for use in printing according to an exemplary embodiment of the present invention.

FIG. 6 is a flowchart of a method for setting and retrieving a printer-specific job setting, in accordance with the method of FIG. 5.

DETAILED DESCRIPTION OF THE EMBODIMENTS AND BEST MODE OF CARRYING OUT THE INVENTION

Figure 1:
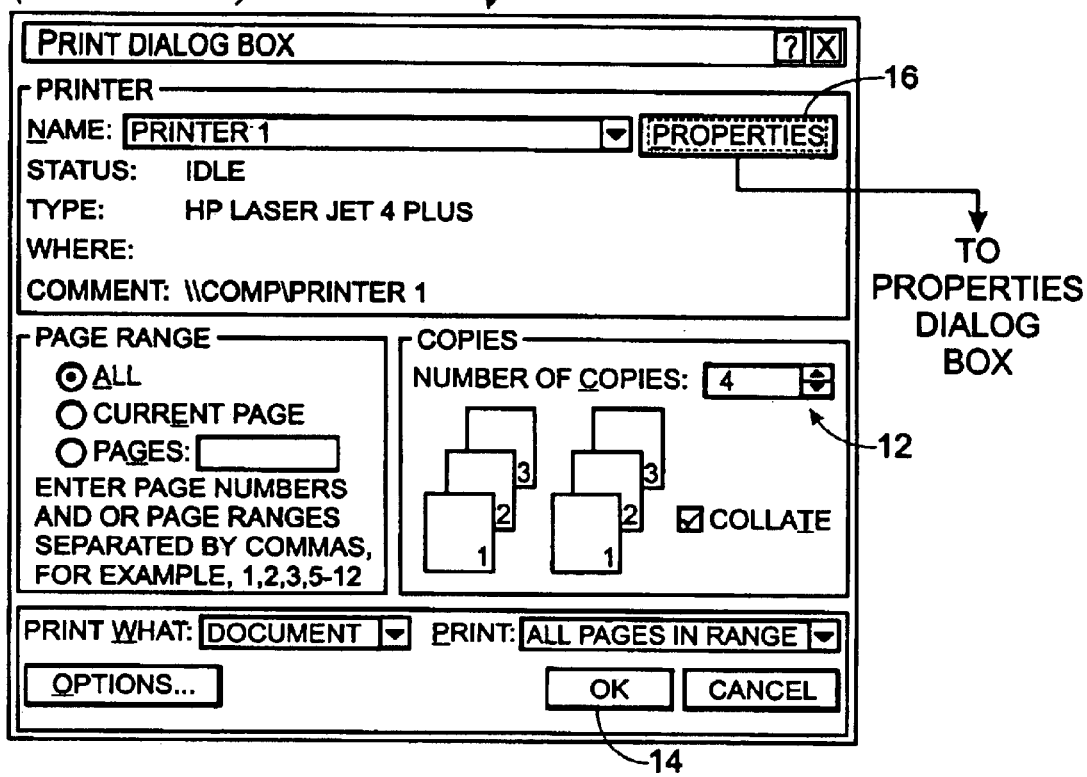
FIG. 1 is a schematic view of a prior art print dialog box.
Figure 2:
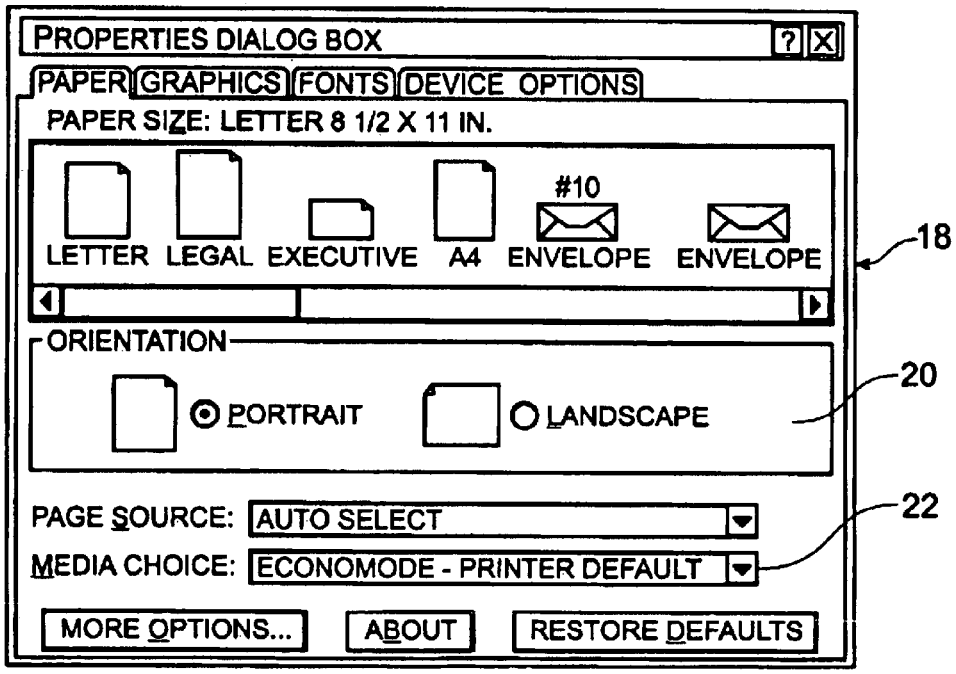
FIG. 2 is a schematic view of a prior art print properties dialog box.

Referring now to FIGS. 1 and 2, a prior art print dialog box configured for a WINDOWS operating system is shown generally at 10. Prior art print dialog box 10 typically is displayed by an application program in response to user selection of a menu option FILE:PRINT. As described above, the WINDOWS family of operating systems available from Microsoft Corporation of Redmond, Wash. uses a data structure known as "DEVMODE," to store job settings for each print job. The DEVMODE data structure includes a public portion having printer-independent job settings, and a private portion having printer-specific job settings. Although the embodiments of the present invention will be described with reference to the DEVMODE data structure, it will be appreciated that virtually any print job settings structure that includes printer-specific job settings may be used.

Upon creation of the print dialog box 10, the application program instructs the printer driver associated with the selected printer to copy an instance of the DEVMODE structure for the current print job into a program addressable area in memory. The application program is able to manipulate printer-independent job settings stored in the public portion of the current DEVMODE instance because the application program knows the identity and location of each of the settings within the public portion of the DEVMODE, based on published standards. These standards are publicly available from Microsoft Corporation of Redmond, Wash., via Microsoft Corporation's web site at http://www.microsoft.com/DDK/DDKdocs/win98ddk/graphcnt_1m0m.htm.

For example, the application program may detect that the document to be printed has been set up for A4 size paper, and in response may change the "paper size" parameter within the public portion of the current DEVMODE to the value "A4." Or, the user may indicate via selector 12 of the print dialog box 10 that four copies of the document are to be printed in the current print job, and in response, the application program may change the "copies" parameter within the public portion of the current DEVMODE to the Upon selection of the OK button 14, the application program sends the current DEVMODE back to the printer driver along with the current print job. The printer driver, in turn, causes the print job to be printed on the selected printer, according to the job settings specified in the current DEVMODE.

To access printer-specific settings stored in the private portion of the DEVMODE, the user may select a "properties" button 16 in the print dialog box, on a per-print-job basis. Properties button 16 causes a print properties dialog box 18 to appear. The print properties dialog box 18 is created by the printer driver associated with the selected printer. The print properties dialog box 18 contains selectors enabling the user to alter both printer-independent job-settings, such as orientation 20, and printer-specific job settings, such as media choice 22. This is possible because the printer driver is able to access both the private and public portions of the DEVMODE. When the properties dialog box 18 is closed, the printer driver is able to pass the DEVMODE, with the altered public and private parameters, back to the application, and the application program returns focus to the print dialog box 10. However, the application is unable to know, utilize, or alter the contents of the private portion of the DEVMODE received from the print driver. When the user selects OK button 14 to commence printing with the job settings set to values selected through dialog boxes 10 and 18, the application program merely passes the DEVMODE with the private job settings intact as received from the printer driver, back to the printer driver.

The application program is not able independently to create a print dialog box with selectors for altering printer-specific job settings, such as stapling, autoduplexing, etc., because the application program does not have access to the identity and location of the printer specific settings contained within the private portion of the current DEVMODE. The inability of the application program to directly and programmatically access the private portion of the DEVMODE is a significant drawback, which prevents the application program from fully taking advantage of various printer-specific capabilities.

Figure 3:
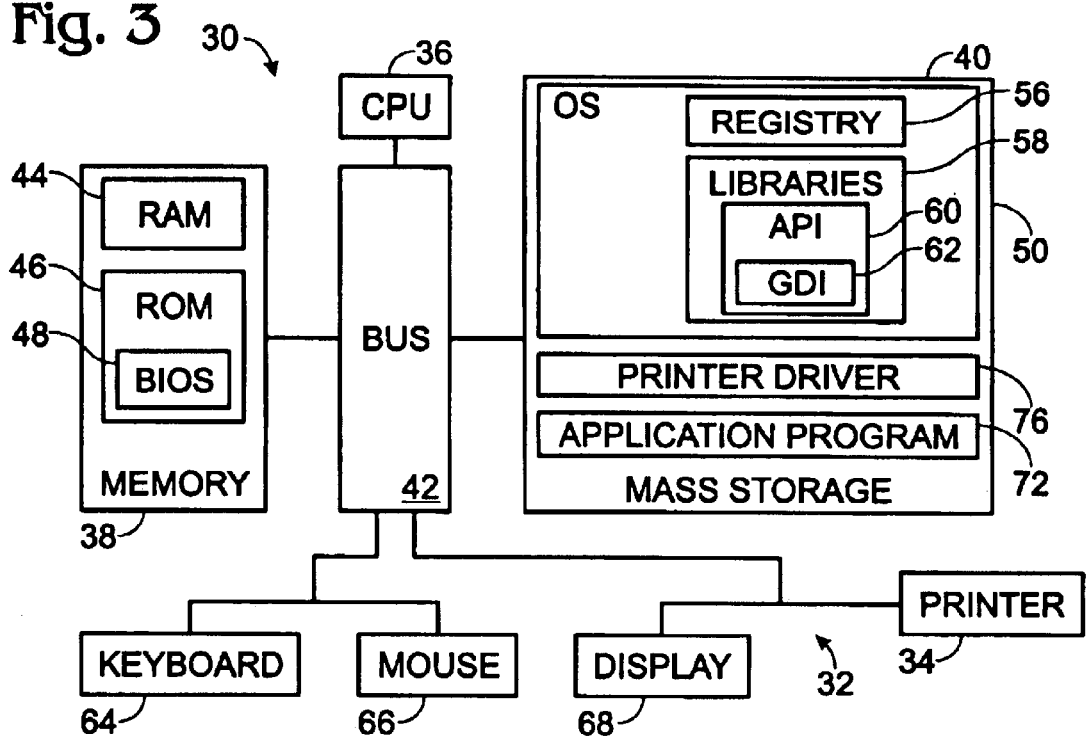
FIG. 3 is a schematic view of an operating environment defined in accordance with the present invention.

Turning now to FIG. 3, an operating environment in which the exemplary embodiments of the present invention may be practiced is shown generally at 30. The operating environment includes a computing device 32 linked to a printer 34. The computing device typically includes a central processing unit 36, memory 38, and mass storage device 40, each linked to a bus 42. The mass storage device may be a hard drive, CD ROM drive, magnetic disk drive, tape drive, flash memory, or other mass storage device.

Memory 38 typically includes random access memory (RAM) 44, read only memory (ROM) 46, and a basic input output system (BIOS) 48, which contains software routines necessary to start-up and operate computing device 32. Computer-readable data such as an operating system 50, printer driver 76, and application program 72 are typically stored on mass storage device 40. As described below, printer driver 76 is typically configured to receive a command from application program 76 to read and/or alter, that is get and/or set, the value of a printer-specific job setting located in a private portion of a DEVMODE instance. In response to the command, the printer driver is configured to alter the value of the printer-specific job setting.

Operating system 50 is typically WINDOWS 95, WINDOWS 98, WINDOWS 2000, WINDOWS NT, or other WINDOWS operating system. Operating system 50 typically includes an associated registry 56, which stores hardware and software settings used in operation of computing device 32, as well as libraries 58 containing code for implementing functions shared by different application programs on computing device 32. Libraries 58 store various Application Program Interface (API) functions 60, certain of which form a Graphics Device Interface (GDI) 62 of the operating system. Computing device 32 also typically includes input devices such as a keyboard 64 and a mouse 66, and an output device such as display 68.

Figure 4:
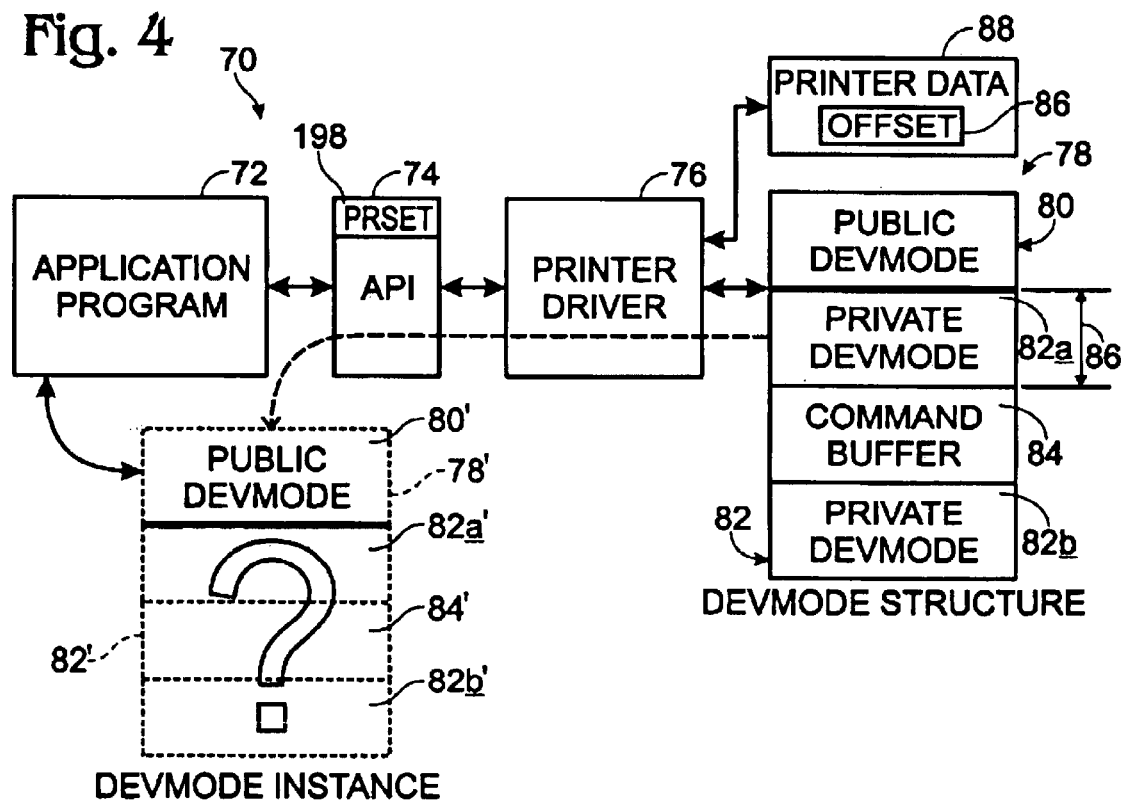
FIG. 4 is a schematic view of a software architecture according to an exemplary embodiment of the present invention.

FIG. 4 shows a software architecture 70 according to one exemplary embodiment of the present invention. Software architecture 70 includes an application program 72 configured to make function calls using an API 74 to communicate with a printer driver 76. Application program 72 is configured to obtain a DEVMODE instance, shown at 78', from printer driver 76 by making a function call to the WINDOWS operating system API such as ExtDeviceModeo( ) (for 16 bit WINDOWS operating systems), DocumentProperties( ) (for 32 bit WINDOWS operating systems), or some other API suitable to obtain a DEVMODE. In response, printer driver 76 returns to application program 72 an instance 78' of a DEVMODE, which is created based on DEVMODE structure 78. For simplicity, DEVMODE instance 78' may be alternatively referred to herein as "a DEVMODE."

DEVMODE structure 78 includes a public portion 80 containing standardized parameters related to printer-independent job settings. DEVMODE structure 78 also includes a private portion 82, including printer-specific job settings. The private portion typically is accessible only by printer driver 76. Private portion 82 typically includes a first portion 82a positioned immediately adjacent the end of public portion 80. Typically, first portion 82a contains driver private data. The private portion 82 additionally includes a command buffer 84 positioned a predetermined distance from the end of the public portion 80 of DEVMODE structure 78, immediately after first portion 82a. This distance is referred to as the command buffer offset 86. The private portion 82 further includes a second portion 82b positioned after the command buffer 84. Second portion 82b contains printer-specific job settings, such as those listed below. Alternatively, the command buffer may be positioned of other predetermined location within DEVMODE 78.

The structure of command buffer 84 is typically defined as follows.

```
typedef struct
{
    DWORD  dwPDMASig;   // Signature to ensure the offset is valid
    char   cCommand;    // in - GET, SET or ENUMERATE
    char   cError;      // out - always examine for any error
    SHORT  sIndex;      // in - used only for ENUMERATE
                        // command to get the next item
    DWORD  dwIdentifier;// in - identifies the private devmode
                        // parameter
    DWORD  dwvalue;     // in/out - value to set for the SET
                        // command, value returned for GET
                        // command
```

-continued

```
    WCHAR    stringData[MAX_PATH];   // in/out - value to set
                                     for SET command, value
                                     returned for GET command
} HPJPDMACCESS, FAR *LPHPDJPDMACCESS
```

In the above example, the command buffer is called HPDJPDMACCESS, and includes members dwPDMASig, cCommand, cError, sIndex, dwIdentifier, dwValue, and stringData. Member dwPDMASig is configured to contain a signature used to ensure that the command buffer offset is valid. Member cCommand is configured to contain a command to be passed from the application program to the printer driver, and is typically GET, SET, or ENUMERATE. Member cError is used to transmit an error code from printer driver 76 to application program 72 in the event that an error occurs. Member sIndex is used to pass an index value used to indicate the $n^{th}$ parameter in the private portion 82 of DEVMODE structure 78. Member dwIdentifier is used to pass a parameter identifier between application program 72 and printer driver 76. Members dwValue and stringData are used to pass a numeric value and/or string data (hereinafter value/string) corresponding to a predetermined parameter in the private portion of the DEVMODE between application program 72 and printer driver 76.

Application program 72 also is configured to query printer data 88 using a WINDOWS operating system API 74 such as GetPrinterData( ) or other suitable function call. The value for the command buffer offset 86 typically is stored within printer data 88, and can be retrieved by application program 72.

To print a document, application program 72 typically obtains a DEVMODE instance 78' from printer driver 76 using a suitable API 74, such as ExtDeviceMode( ) or DocumentProperties( ). Application program 72 typically reserves an area of application addressable memory for DEVMODE instance 78', and printer driver 76 places the DEVMODE instance 78' in the application-addressable memory at the appropriate location. Application program 72 is able to modify parameters in public portion 80' of DEVMODE instance 78', using pre-published standards relating to these parameters. For example, the application program may alter a parameter relating to the number of copies to be printed for a particular print job by altering data within the public DEVMODE 80' at the appropriate location. According to prior printing methods, application program 72 could not alter printer-specific parameters contained in private portion 82' because the identity and location of the parameters within private portion 82' of the DEVMODE 78' were not known or available to application program 72. According to the following described method, application program 72 may access directly and perform predetermined operations upon the printer-specific job settings contained in the private portion 82' of DEVMODE instance 78'.

In FIG. 5, a method according to an exemplary embodiment of the invention for printing a print job from an application program to a selected printer is shown generally at 100. At 102, method 100 typically includes retrieving a DEVMODE instance 78' for the selected printer. Typically, the DEVMODE 78' includes a public portion, a private portion, and a command buffer, as described above. Typically, the DEVMODE 78' is retrieved by application program 72 from a printer driver 76 for the selected printer, typically printer 34, by utilizing a WINDOWS API function call, such as DocumentProperties( ) or ExtDeviceMode( ).

At 104, the method typically includes querying printer data 88 to determine if the selected printer 34 supports access to the private portion 82' of the DEVMODE 78'. At 106, the method typically includes retrieving from printer data 88, a command buffer offset 86. In one embodiment of the invention, steps 104 and 106 are performed in one operation. Application program 72 queries printer data 88 to determine whether there is a non-zero offset value 86 present in the printer data. If so, application program 72 is configured to understand that the selected printer supports access to the private portion 82' of DEVMODE 78'. After the function call is made, the API returns the command buffer offset 86 to the application program 72.

At 108, the method typically includes retrieving the size of the public portion 80' of the DEVMODE 78'. Typically, this is accomplished by application program 72 accessing a parameter representing the size of the public portion 80', which parameter is contained within the public portion of the DEVMODE 78'. Alternatively, the size value may be stored elsewhere on computing device 32, or may be a constant.

At 110, the method typically includes calculating the address of the command buffer 84' within private portion 82' of DEVMODE 78'. Typically, this is accomplished by taking a pointer to the beginning of DEVMODE 78', and adding to the pointer the size, in bytes, of public portion 80' (retrieved at 108) and command buffer offset 86 (retrieved at 106).

Once the address of the command buffer has been calculated, the method further includes, at 112, verifying the validity of the command buffer address by checking a signature of a command buffer. The signature of the command buffer is a predetermined identifier stored within the command buffer. Typically, the signature is the first DWORD member in the command buffer, as shown above. An exemplary value for the signature is 0xBADACC00.

At 114, the method further includes setting the command buffer to indicate a predetermined command. Typically, the predetermined command may be GET, SET, or ENUMERATE, although virtually any command suitable to perform a predetermined operation related to a parameter stored in the private portion 82' of DEVMODE 78' may be used. At 116, the method further includes sending DEVMODE 78' with the command received at 114 to printer driver 76. At 118, the method further includes executing the command. At 120, the method includes continuing a current operation of the application program, for example, by sending a print job to printer driver 76 for printing. Further details related to setting the command at 114, sending the DEVMODE 78' at 116, and executing the command at 118, are given below with reference to FIGS. 6 and 7.

Exemplary computer code for implementing the method of FIG. 5 is contained in Appendices A and B.

Turning now to FIG. 6, a method for transmitting commands between application program 72 and printer driver 76 is shown generally at 130. When the command is GET, the method follows the path shown at 132, and when the command is SET, the method follows the path shown at 134. At 136, the method typically includes, from the application, setting a command within the command buffer to GET, typically via member cCommand described above. At 138, the method typically includes setting an identifier within the command buffer of DEVMODE 78' to a desired job-setting parameter for which application program 72 desires to obtain a value. Typically, this is accomplished by setting dwIdentifier, described above, to a printer-specific job parameter stored in private portion 82' of DEVMODE 78'.

The printer-specific job setting may be virtually any job setting. An exemplary list of printer-specific job settings typically contained within the private portion 82' of the DEVMODE 78' follows.

Exemplary List of Printer Specific Job Settings
Boolean Items

1. Page Border (HPDJ_PDMID_PAGE_BORDERS)

This setting controls whether, when multiple pages are printed on each physical page, borders are to be drawn around each logical page. If N-UP printing, a mode in which N pages of a document are printed on a single sheet of paper, is not enabled, this setting will be ignored. This setting is typically allowed for both SET and GET commands.

2. Mirrored Printing (HPDJ_PDMID_FLIP_HORIZONTAL)

This setting enables the application program to instruct the printer to print a mirror image of the print job. This functionality is useful for T-shirt transfer, transparency media, etc. This setting is typically allowed for both SET and GET commands.

3. Ordered Printing (HPDJ_PDMID_ORDERED_PRINTING)

This setting controls the order in which the pages are printed. Enabling this setting will result in the last page being printed first. This setting is typically allowed for both SET and GET commands.

4. Banner Printing Capability (HPDJ_PDMID_CAN_DO_BANNER)

This setting may be queried by the application program to determine whether the printer has banner printing capability. This setting is typically allowed for the GET command only.

5. Enable Banner Printing (HPDJ_PDMID_BANNER_SETTING)

The application program may use this setting to determine whether banner printing is enabled, using the GET command, and to enable banner printing, using the SET command. Typically, it is the application's responsibility to ensure that banner paper is loaded in an input tray of the selected printer. If cut sheets are loaded and banner printing is enabled, an OUTOFPAPER error may result. In addition, the user typically must push a specially designed banner lever on the printer to the "on" position to enable banner printing. Before enabling banner printing, the application program sets the dmMediaType member of the DEVMODE to the media type ID corresponding to "BP Banner Paper" and the dmPaperSize member of the DEVMODE to an appropriate media size value. The ID for media type can be obtained using the ENUMERATE command for the MEDIA_TYPE and the paper size ID can be obtained by calling the Windows operating system API DeviceCapabilities( ).

6. Fax or Photocopy (HPDJ_PDMID_FAX_PHOTOCOPY)

Enabling this setting causes the printer to print output in monochrome/grayscale suitable for faxing or photocopying. Typically, before enabling this attribute, the application program must first set the dmColor member of the DEVMODE to DMCOLOR_MONOCHROME. The application program is typically configured to use both GET and SET commands with this setting.

7. Print Preview (HPDJ_PDMID_PRINT_PREVIEW)

This setting brings up a print preview program, allowing a user to view the output of a print job on the display before sending it to the printer. This setting is typically allowed for both SET and GET commands.

8. Automatic Two Sided Printing (HPDJ_PDMID_CAN_DO_AUTO_DUPLEX)

This setting allows an application to query if the printer is capable of duplexing automatically, and is available for use with the GET command only.

9. Control Automatic Two Sided Printing (HPDJ_PDMID_AUTO_DUPLEX_SETTING)

This setting enables automatic duplexing on those printers that are equipped with autoduplexing capability. This setting is allowed to be used with both SET and GET commands.

Integer Items

1. Page Mode (HPDJ_PDMID_PAGEMODE)

This setting controls logical to physical page mapping, and is typically set to a value of NORMAL, NUP, POSTER or BOOKLET, indicated by a corresponding integer between 1 and 4. Application programs can call the ENUMERATE command to enumerate page modes supported by the printer driver. This setting is also configured for use with the GET and SET commands.

2. Page Count (HPDJ_PDMID_PAGECOUNT)

When Page Mode is set to one of NUP or POSTER, this setting controls the number of pages to be printed on a single page, and the number of pages on which a poster is to be printed, respectively. The actual value set will be returned in dwValue of the HPDJPDMACCESS structure. Application programs can call the ENUMERATE command to enumerate permitted values after setting the page mode. This setting is also configured for use with the SET and GET commands.

3. Color Control (HPDJ_PDMID_COLOR_TONE)

This setting typically is set to an integer value between −4 and +4, and is configured to be used with both SET and GET commands.

4. Brightness (HPDJ_PDMID_BRIGHTNESS)

This setting controls brightness, and typically is an integer value between −4 and +4. This setting is typically configured for use with both SET and GET commands.

5. Color Saturation (HPDJ_PMID_SATURATION)

This setting controls color saturation, and typically is an integer value between −4 and +4. This setting is configured for use with both SET and GET commands.

6. Ink Levels (HPDJ_PDMID_INK_LEVELS)

This setting typically controls ink level, and is configured to be an integer value between −2 and +2. This setting is configured for use with both SET and GET commands.

7. Output Scaling (HPDJ_PDMID_ZOOM_FACTOR)

This setting controls output image scaling, and is typically a value between 50 and 100, corresponding to a 0.5 to 1.0 zoom factor. This setting is configured for use with both SET and GET commands.

8. Output Scaling Mode (HPDJ_PDMID_ZOOMSMART_MODE)

This setting is typically set to one of the following.
   a. HPDJ_PDMVALUE_ZOOMSMARTMODE_NORMAL—Uses ZOOM_FACTOR for output scaling.
   b. HPDJ_PDMVALUE_ZOOMSMARTMODE_TARGET_PAPERSIZE—Scales the output to the paper size specified by ZOOMSMART_PHYSICAL_PAPER_SIZE. ZOOM_FACTOR is ignored for this setting.
   c. HPDJ_PDMVALUE_ZOOMSMARTMODE_FITTOPAPER—This mode is mainly used in conjunction with auto duplexing. The auto-duplexer cannot print within 0.5 inch from the top or bottom edge of the paper. If the top or bottom margin of the document is less than 0.5 inches and automatic duplexing is enabled, the application program typically sets this mode to prevent any clipping at the top or bottom edge. The printer driver will shrink the image by about 2.5% to fit the image to the paper.

This command is configured for use with both SET and GET commands.

9. Scale Output to Specified Paper Size (HPDJ_PDMID_ZOOM_SMART_PHYSICAL_PAPER_SIZE)

This setting scales output from the paper size set in dmPaperSize to a target paper size, which may be any paper size supported by the printer. Supported paper sizes can be obtained by calling the WINDOWS operating system API DeviceCapabilities( ). The value of this setting is used for output scaling if ZOOMSMART_MODE is set to TARGET_PAPER_SIZE. This setting is configured for use with both SET and GET commands.

10. Extra-Dry Time (HPDJ_PDMID_EXTRA_DRYTIME)

This setting typically enables application programs to request that the printer hold a sheet of paper for an additional period to ensure full dryness before dropping the paper on to the printer tray. This functionality is useful for media such as photographic paper, where a higher amount of ink is typically deposited on the paper. The value is typically set to between 0 and 30.

String Items

1. Media Type (HPDJ_PDMID_MEDIA_TYPE)

This setting contains the name of the media type currently set. The printer driver internally uses an integer ID in the public DEVMODE for the media type. To change the Media. Type setting, the application program typically first enumerates the media types supported by using the ENUMERATE command. The ENUMERATE command returns the media name as a string and the corresponding integer ID in the dwValue member. This integer value can be used to set the media type the public portion of the DEVMODE.

At 140, the method typically includes sending DEVMODE 78' to printer driver 76. DEVMODE 78', it will be appreciated, contains the job-setting parameter received at 138. Typically, the DEVMODE is sent from application program 72 to printer driver 76 using a function call to the WINDOWS operating system API DocumentProperties( ).

At 142, the method typically includes reading the command from the command buffer 84'. This occurs at printer driver 76. At 144, the method further includes setting the dwValue/stringData member in the command buffer to the value/string for the job-setting indicated within the dwIdentifier member of the command buffer. Again, this occurs at printer driver 76.

At 146, the method further includes returning DEVMODE 78' from the driver to the application, the DEVMODE containing the value or string data (whichever is applicable) associated with the indicated job-setting parameter. At 148, the method further includes, at the application, reading the value/string from DEVMODE 78'. At 150, the method further includes continuing the current operation within the operation program, for example by creating a print dialog box or print preview window. Steps 136–150 may be used to retrieve a value and/or string data associated with a particular printer-specific job-setting parameter contained within the private portion 82 of the DEVMODE 78'.

To send a SET command from the application program 72 to printer driver 76, the method includes, at 152 setting the command contained within command buffer 84' to SET. This occurs at application program 72. At 154, the method further includes setting the member dwIdentifier of command buffer 84' to a job-setting parameter which application program 72 desires to set.

At 156, the method further includes setting dwValue/stringData of command buffer 84' to a desired value/string to which the application program 72 desires to set the identified job-setting parameter. At 158, the method includes sending DEVMODE 78' with the recently altered command buffer from application program 72 to printer driver 76. Typically, this is accomplished by a function call to a suitable WINDOWS operating system API, such as DocumentProperties( ).

At 160, the method includes reading the command in the command buffer of DEVMODE 78' at the driver. At 162, the method includes reading the value or string, as appropriate, stored in the command buffer. At 164, the method includes setting the value/string associated with the identified job setting parameter to the value/string contained within the command buffer members dwValue/stringData. As will be apparent, this is accomplished at the printer driver. The printer driver is able to set parameters within the private portion of the DEVMODE because the driver has access to the identity and contents of parameters of the private DEVMODE.

At 166 the method includes returning DEVMODE. 78' from printer driver 76 to application program 72. This typically is accomplished by returning the DEVMODE at the conclusion of the function call to DocumentProperties( ).

At 168, the method typically includes continuing a current operation at the application program. For example, once the printer specific job setting is set to the desired value, the application program may commence printing the print job to the selected printer, using DEVMODE 78'.

Figure 7:
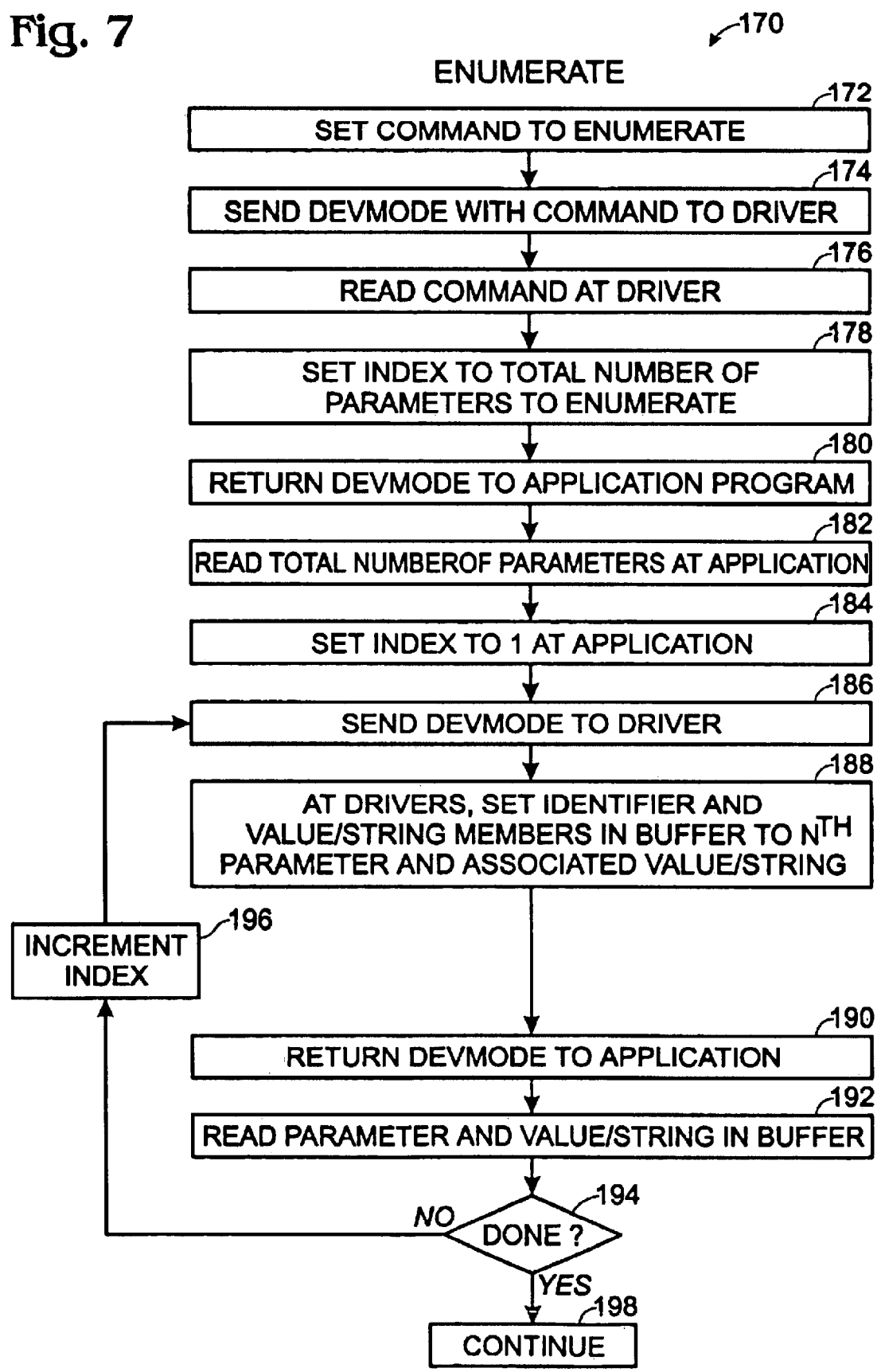
FIG. 7 is a flowchart of a method for enumerating printer specific job settings, in accordance with the method of FIG. 5.

Turning now to FIG. 7, a method for enumerating the identity and value and/or string associated with parameters stored in a private portion of the DEVMODE is shown generally at 170. At 172, the method includes setting a command within command buffer 84' of DEVMODE 78' to ENUMERATE. This is accomplished at application program 72. At 174, the method includes sending DEVMODE 78 to printer driver 76 from application program 72. Typically, this is accomplished by a function call to the WINDOWS API, DocumentProperties( ).

At 176, the method includes reading the command from the command buffer 84'. This is accomplished at printer driver 76. At 178, the method includes setting dwIndex of command buffer 84' to a total number of parameters contained within a private portion 82' of DEVMODE 78'. Again, this occurs at printer driver 76. At 180, the method includes returning DEVMODE 78' from the printer driver 76 to application program 72. Typically, this is accomplished by returning DEVMODE 78' at the conclusion of the function call to the WINDOWS operating system API DocumentProperties( ).

At 182, the method includes reading the total number of parameters to enumerate from the dwIndex value in command buffer 84'. This is accomplished at application program 72. At 184, the method further includes setting the dwIndex value contained within command buffer 84' to 1, such operation again occurring at the application program 72. At 186, the method further includes sending DEVMODE 78' with the recently set index to printer driver 76 from application program 72. At 188, the method includes setting dwIdentifier and dwValue/stringData of command buffer 84' to the parameter and value/string for the $n^{th}$ parameter in the private portion of the DEVMODE, where n is the value in dwIndex. This occurs at the printer driver 76. At 190, the method further includes returning DEVMODE 78' from printer driver 76 to application program 72, typically at the conclusion of the function call to the WINDOWS operating system API DocumentProperties( ).

At 192, the method further includes reading the recently set parameter and value/string contained within command buffer 84'. This occurs at application program 72. The application program may store this data in another location for future use.

At 194 the method further includes determining whether the printer driver is done enumerating parameters from the private portion 82' of DEVMODE 78'. This typically is accomplished by comparing the current value in dwIndex of command buffer 84' to the total number of parameters to be enumerated received at 182, discussed above. If the application program is not done enumerating, the method further includes, at 196, incrementing the index within the command buffer 84' by one unit and, at 186, sending DEVMODE 78' from application 72 back to printer driver 76. Steps 188–194 are repeated, until it is determined at 194 that all of the parameters and their associated values/strings have been enumerated. Finally, at 198, the method includes continuing a current operation at application program 72. For example, application program 72 may commence printing a print job on printer 34.

Figure 8:
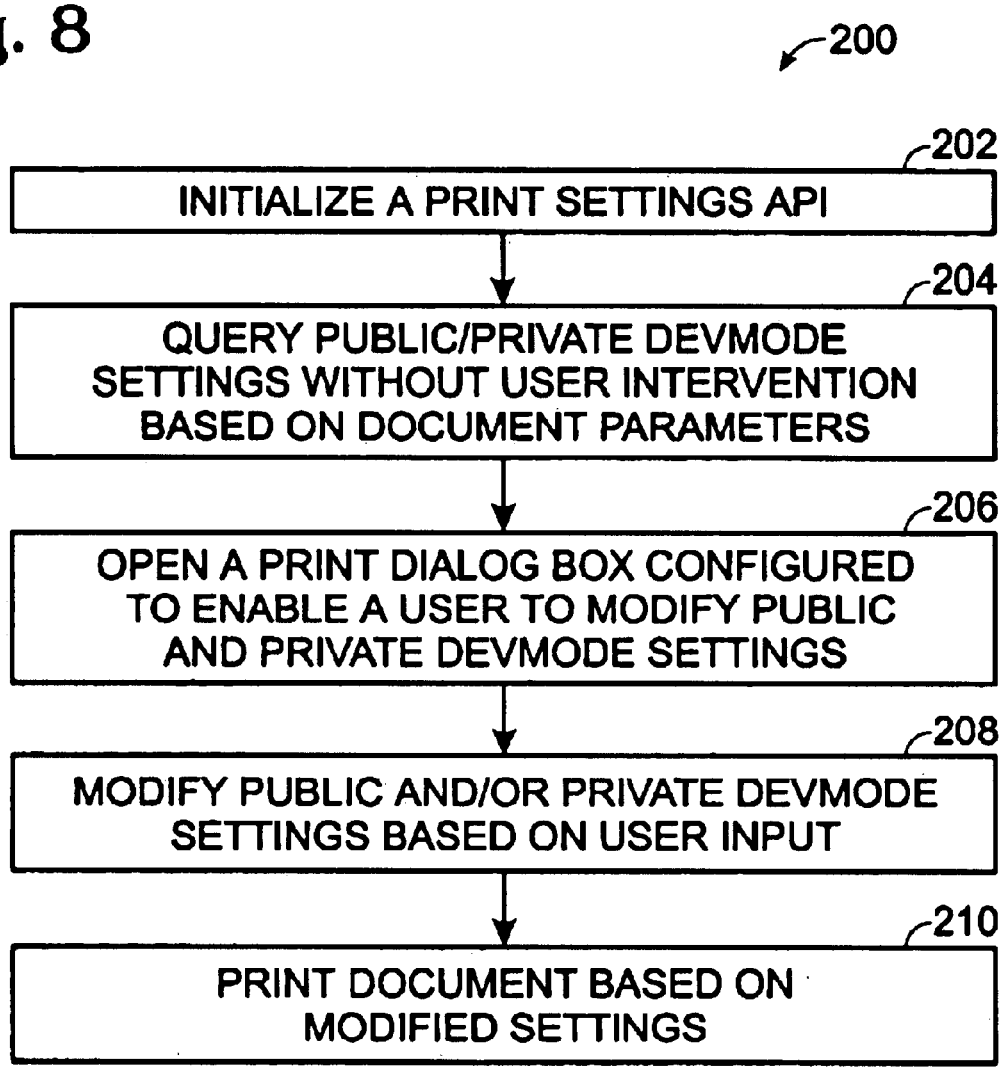
FIG. 8 is a flowchart of a method for use in printing according to another exemplary embodiment of the present invention.

Turning now to FIG. 8, a printing method according to another exemplary embodiment of the invention is shown generally at 200. At 202, the method includes initializing a PrintSettings( ) API. The PrintSettings( ) API is configured to enable application programs 72 to GET, SET, and ENUMERATE job settings contained in the public and private portions of the DEVMODE. Initializing the PrintSettings( ) API typically includes opening the selected printer, obtaining a DEVMODE 78', retrieving the size of the public portion 82' of the DEVMODE 78', retrieving command buffer offset 86 from printer data 88, and calculating the address of the command buffer, as described above.

At 204, the method includes querying job settings contained in the public and private portions of the DEVMODE, programmatically, without user intervention, based on document parameters. For example, application program 72 may use the PrintSettings API to enumerate the printer-specific job settings stored in the private portion 82' of the DEVMODE 78'. The application program may then select appropriate printer-specific settings to alter. For example, if a document parameter indicates that the document contains only 256 colors, the application program 72 may automatically set printer-specific color settings within the private portion 82' of the DEVMODE 78' appropriately. In another example, the application program may obtain a printer specific setting for stapling, and use this information to graphically represent staples in correct orientation on a document during a "Print Preview" of the document. In addition, the application program may select relevant printer-specific job settings to display in a customized print dialog box, as described below.

Figures 9, 11:
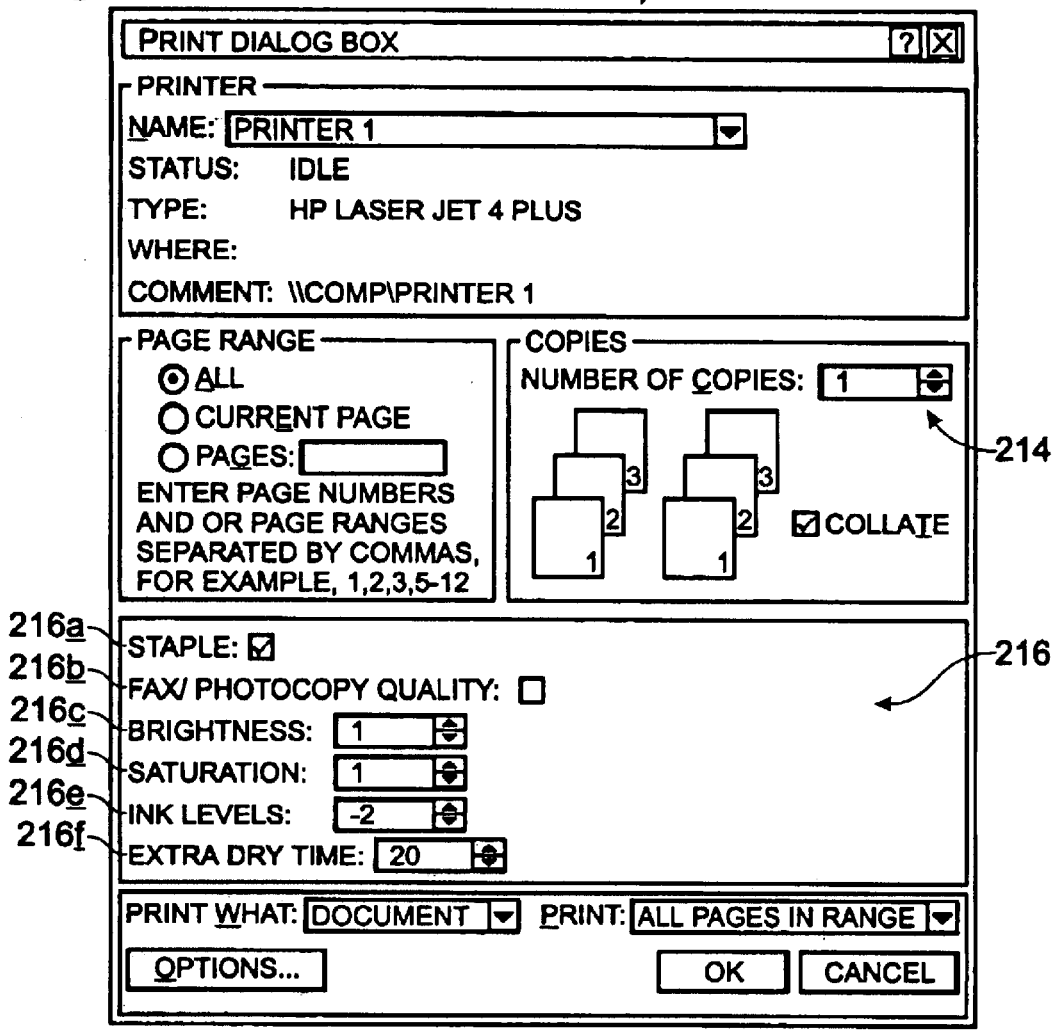
FIG. 9 is a schematic view of a print dialog box according to an exemplary embodiment of the present invention.
FIG. 11 is a flowchart of a method for use in printing according to another exemplary embodiment of the present invention.

At 206, the method further includes opening a print dialog box, shown at 212 in FIG. 9. The print dialog box 212 is configured to enable a user to modify public and private DEVMODE settings. Print dialog box 212 typically includes at least one selector 214 configured to modify a public, printer-independent job setting, such as number of copies. In addition, print dialog box 212 typically includes at least one selector 216 configured to modify a private, printer-specific job setting. For example, print dialog box 212 may include staple selector 216a, fax or photocopy quality selector 216b, brightness selector 216c, saturation selector 216d, ink level selector 216e, and/or extra dry time selector 216f. The print dialog box 212 is created by the application program, not by the printer driver. Print dialog box 212 typically does not include a properties button 16, although such a button may be included.

At 208, the method typically includes modifying printer-independent job settings contained in the public DEVMODE and printer-specific job settings contained in the private DEVMODE, based on user input received via print dialog box 212. At 210, the method includes printing the document the selected printer, based upon the modified job settings.

Figure 10:
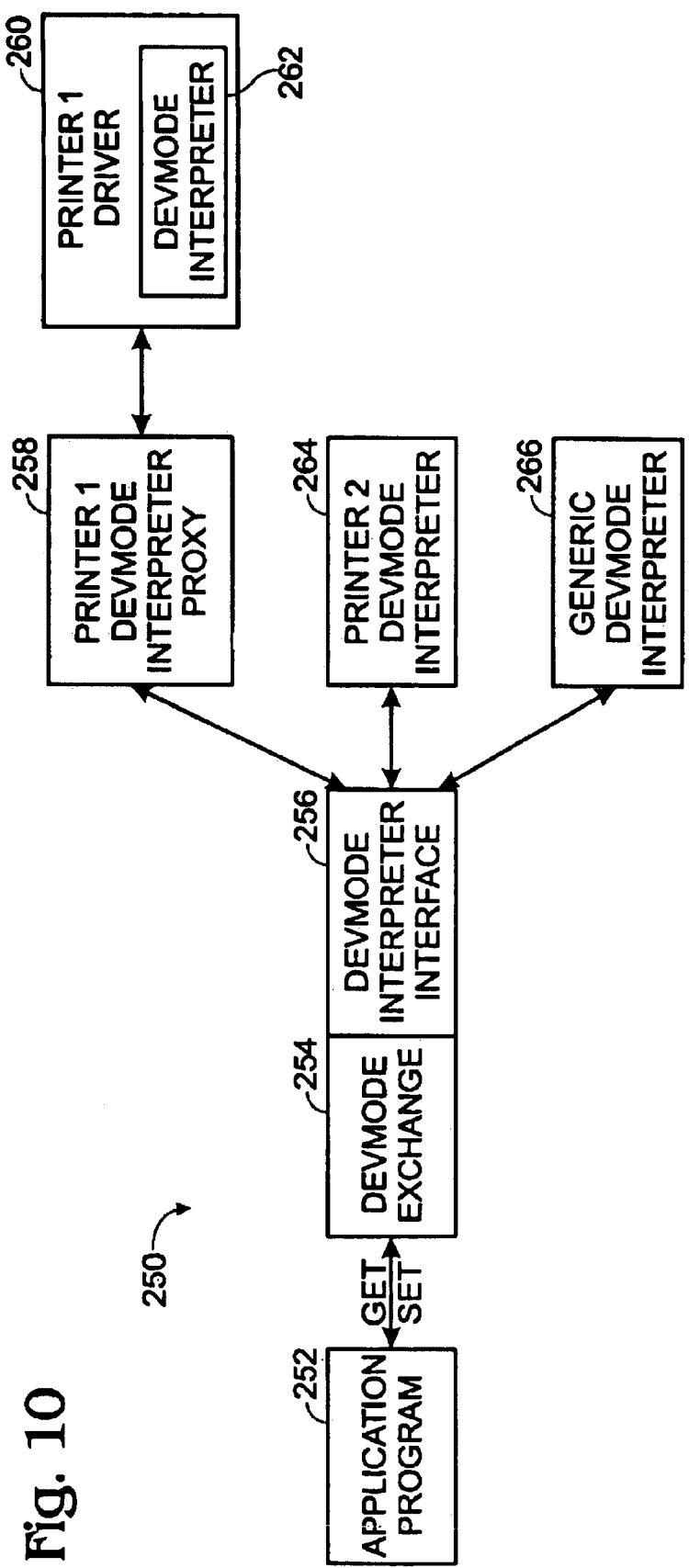
FIG. 10 is a schematic view of an alternative software architecture defined in accordance with the present invention.

Turning now to FIG. 10, a software architecture according to another exemplary embodiment of the present invention is shown generally at 250. Architecture 250 typically includes a client application program 252 configured to GET and SET public and private DEVMODE parameters via an agent, such as DEVMODE exchange program (DMX) 254. The DMX includes a DEVMODE interpreter interface 256 configured to send and receive data with a DEVMODE interpreter (DMI) 262, 264, 266 for each printer. Typically, both the DMX and DMI modules are contained in libraries accessible by client application program 252, and preferably in Dynamic Link Libraries (DLLs) of the WINDOWS operating system. The DMX may use a lookup table to find an appropriate DMI module to use in order to access the private DEVMODE of a selected printer. Alternatively, a user defined database may be used to associate a DMI with a selected printer, or the DMX may locate an appropriate DMI in another suitable manner.

Each DMI typically knows the structure of a particular version the DEVMODE for a corresponding printer, and may also know about the structure of different versions of the DEVMODE structure for the printer. Typically, the DMI is a DLL file, such as shown at 264, and is configured to receive GET, SET, and ENUMERATE commands related to printer-independent and printer-specific job settings contained in public and private portions of the DEVMODE. The GET, SET, and ENUMERATE commands are similar to those described above, and will not be redescribed in detail. The DMI is configured to send appropriate responses to these commands to the application program through the DMX.

While the DMI typically is a DLL file, as shown at 264, the DMI may exist within the printer driver files. In this case the DEVMODE interpreter interface 256 accesses the DMI through a DEVMODE interpreter proxy 258, which passes commands such as GET, SET, and ENUMERATE from the DMX to the DMI contained within the printer driver. In return, the DMI 262 within print driver 260 returns the appropriate data, through the proxy 258 and DMX 254, to the application program 252.

Where a DMI is not available for a particular printer, the DMX may utilize a generic DEVMODE interpreter 266 to perform GET, SET, and ENUMERATE operations related only to public DEVMODE parameters. It will be understood that DMX 254 and DMIs 262, 264 may be used by application program 252 to create print dialog box 212 containing selectors to modify public, printer-independent print settings, and private, printer-specific print settings.

In FIG. 11, a method for use in printing a print job from an application program on a selected printer is shown generally at 280. The selected printer typically has associated job settings data, such as the data stored in the DEVMODE structure described above. The job settings data typically includes a private portion containing at least one printer-specific job setting. At 282, the method includes providing a program interface configured to enable the application program to access the printer-specific job setting in the private portion of the settings data. The program interface may be in the form of a WINDOWS operating system API, such as DocumentProperties( ) or ExtDeviceMode used in the manner described above, or may be the PrintSettings API or DMX described above, or may be of another suitable form. At 284, the method typically includes, from the application program, sending a command to the program interface. Typically, the command is to perform a predetermined operation related to the printer-specific job setting. The predetermined operation is typically to GET or SET a particular printer-specific job setting with a value and/or string, as described above. The predetermined operation may also be to ENUMERATE a plurality of the printer-specific job settings contained within the settings data. At 286, the method typically includes performing the predetermined operation related to the printer-specific job setting.

While the terms "value" and "string" have been used herein to indicate numeric values and alphanumeric strings, respectively, it will be understood that the term "value" also may encompass numeric, alphanumeric, and Boolean data, or data of virtually any other form.

INDUSTRIAL APPLICABILITY

The embodiments of the present invention are applicable to computer systems that utilize printers.

While the present invention has been particularly shown and described with reference to the foregoing exemplary embodiments, those skilled in the art will understand that many variations may be made therein without departing from the spirit and scope of the invention as defined in the following claims.

APPENDIX A

Example Routine

```
//
//   Get the current or default devmode from the driver.
//   First, get the printer handle.
//
    HANDLE     hprinter;
    OpenPrinter (lpszFriendlyName, &hPrinter, NULL) ;
    If (hprinter == NULL)
    {
        // Unable to open printer, won't be able to get devmode
        return;
    }
//
//   Query if this driver supports Marconi interface.
//
    DWORD      dwResult;
    DWORD      dwType;
    DWORD      dwSizeNeeded;
    DWORD      dwOffset;
    DwOffset = 0;       // initialize offset value
    dwResult =GetPrinterData (hPrinter, (LPTSTR)
HPDJ_CMD_BUF_OFFSET, &dwType,
                           &dwOffset, sizeof (DWORD) ,
&dwSizeNeeded) ;
//   The returned dwOffset value must be a non-zero positive integer.
    if (dwResult != ERROR_SUCCESS || dwOffset <= 0)
    {
        // This driver does not support Marconi interface.
        ClosePrinter (hPrinter) ;
        return;
    }
//
//   Get the size in bytes required for this driver's devmode
structure.
//
    LONG          lDMSize;
    LPDEVMODE     lpDevmode;
    lDMSize = DocumentProperties (hWnd, hPrinter, lpszFriendlyName,
NULL, NULL, 0) ;
    lpDevmode = (LPDEVMODE) malloc (lDMSize) ;
    if (lpDevmode == NULL)
    {
        // error allocating memory.
        ClosePrinter (hPrinter) ;
        Return;
    }
    LONG       lRet;
    lRet = DocumentProperties (hWnd, hPrinter, lpszFriendlyName,
```

APPENDIX A-continued

Example Routine

```
lpDevmode, NULL,
                              DM_OUT_BUFFER);
    If *(lRet != IDOK)
    {
        // Call failed. Call GetLastError( ) to get the error code.
        ClosePrinter (hPrinter) ;
        Free (lpDevmode) ;
        Return;
    }
//
//   Get the address of Marconi command buffer in the devmode
//
    LPMPDJPDMACCESS    lpCmdBuf;
    lpCmdBuf = (LPMPDJPDMACCESS) ((LPBYTE) lpDevmode +
lpDevmode->dmSize + dwOffset) ;
//
//   Check the validity of this structure.
//
    if ( ! (HPDJ_PDMA_CHECKSIG(lpCmdBuf->dwPDMASig) ) )
    {
//
//       Invalid offset value. Command buffer is not valid.
//       Clean up and return.
    }
//
//   Now we are ready to access this driver's private devmode.
//   Query if the printer/driver supports automatic duplex printing.
//
    lpCmdBuf->cCommand = HPDJ_PDM_CMD_GET;
    lpCmdBuf->dwIdentifier =
    HPDJ_PDMID_CAN_DO_AUTODUPLEX;
    lRet = DocumentProperties (hWnd, hPrinter, lpszFriendlyName,
lpDevmode,
                                  lpDevmode, DM_IN_BUFFER }
DM_OUT_BUFFER) ;
    If (lRet != IDOK)
    {
        // Call failed. Clean up and return.
    }
//
//   Check if Marconi interface returned success.
//
    if (lpCmdBuf->cError != MPDJ_PDM_ERROR_NOERROR)
    {
        // Error in Marconi interface. Clean up and return.
    }
//
//   All went well. dwValue contains the result.
//
    if (lpCmdBuf->dwValue)
    {
        MessageBox (NULL, "This Printer is AutoDuplex capable",
"PDMAccess", MB_OK) ;
    }
    else
    {
        MessageBox (NULL, "This Printer cannot do AutoDuplexing",
"PDMAccess", MB_OK) ;
    }
//
//   Now enable the driver for auto duplexing.
//
    lpCmdBuf->cCommand  = HPDJ_PDM_CMD_SET;
    lpCmdBuf->dwIdentifier =
    HPDJ_PDMID_AUTODUPLEX_SETTING;
    lpCmdBuf->dwValue    = 1;
    lRet = DocumentProperties (hWnd, hPrinter, lpszFriendlyName,
lpDevmode, lpDevmode,
                                          DM_IN_BUFFER |
                                          DM_OUT_BUFFER) ;
//
//   Check for success.
//
    if (lRet != IDOK)
    {
        // Call did not succeed.
    }
```

APPENDIX A-continued

Example Routine

```
if (lpCmdBuf->cError != HPDJ_PDM_ERROR_NOERROR)
{
    // Error. Take action per cError value.
    // Perhaps, media type currently selected is not supported
    // by the auto duplexer.
}
//
//  Enumerate the supported media types and set media type.
//  The name of the media is returned in stringData and the integer
//  index value used by the driver to identify the mediatype is
returned in
//  dwValue.
//
    DWORD                 dwMediaType = -1;
    lpCmdBuf->cCommand    = HPDJ_PDN_CMD_ENUM;
    lpCmdBuf->dwIdentifier = HPDJ_PDMID_MEDIATYPE;
    lpcmdBuf->dwIndex     = 0;
    lpCmdBuf->cError      = HPDJ_PDM_ERROR_NOERROR;
    while (lpCmdBuf->cError == HPDJ_PDM_ERROR_NOERROR)
    {
        lRet = DocumentProperties (hWnd, hPrinter, lpszFriendlyName,
lpDevmode, lpDevmode,
                                    DM_IN_BUFFER |
                                    DM_OUT_BUFFER) ;
        If (lRet == ID_OK && lpCmdBuf->cError ==
HPDJ_PDM_ERROR_NOERROR)
        {
            // All went well. Save the media type returned some
place.
```

APPENDIX A-continued

Example Routine

```
            // The string returned is in ipCmdBuf->stringData.
            }
//          // Save the mediatype index value for photo paper.
            if ( (wcscmp (lpCmdBuf->stringData, TEXT("HP Premium
Photo Paper") ) == 0)
                    deMediaType = lpCmdBuf->dwValue;
                lpCmdBuf->dwIndex++;
        }
//
//  Set media type to HP Premium Photo P'per.
//
    if (dwMediaType != -1)
    {
        lpDevmode->dmFields |= (DM_MEDIATYPE |
        DM_PRINTQUALITY);
        lpDevmode->dmMediaType = dwMediaType;
        lpDevmode->dmPrintQuality = DMRES_HIGH;
    }
//
// All done. This devmode can now be used with CreateDC.
// First, clear the command field in the Marconi command buffer.
//
    lpCmdBuf->cCommand = 0;
```

APPENDIX B

Header File

```
HPDJPDMA.h
#ifndef HPDJPDMA_H
#define HPDJPDMA_H
/*
 *  Value name in PrinterDriverData for byte offset to the command
buffer
 *  from the end of public devmode.
 *  Absence of this value signals that the driver does not allow
access to
 *  private devmode.
 *  This value must be non-zero.
 */
#define HPDJ_1_CMD_BUF_OFFSET TEXT("CmdBufOffset")
/*
 *  Magic number. The very first DWORD in the command buffer must
contain
 *  this number. Else, something went wrong and app should not try to
access
 *  private devmode though this mechanism.
 */
#define HPDJ_PDMA_SIGNATURE 0xBADACC00
#define HPDJ_PDMA_GETVERSION(dwPDMASig) (dwPDMASig & 0x000000FF)
#define HPDJ_PDMA_CHECKSIG(dwPDMASig) ( (dwPDMASig & 0XFFFFFF00) ==
HPDJ_PDMA_SIGNATURE)
/*
 *  Layout of the command buffer.
 */
typedef struct
{
    DWORD       dwPDMASig;
    char        cCommand;
    char        cError;
    SHORT       sIndex;
    DWORD       dwIdentifier;
    DWORD       dwValue;
    WCHAR       stringData[MAX_PATH];
} HPDJPDMACCESS, FAR* LPHPDJPDMACCESS;
```

APPENDIX B-continued

Header File

```
/*
 *  Commands currently supported.
 */
#define HPDJ_PDM_CMD_GET                              0x01
#define HPDJ_PDM_CMD_SET                              0x02
#define HPDJ_PDM_CMD_ENUM                             0x03
/*
 *  Error values.
 */
#define HPDJ_PDM_ERROR_NOERROR                        0x00
#define HPDJ_PDM_INVALID_COMMAND                      0x01
#define HPDJ_PDM_ERROR_UNKNOWN_ID                     0x02
#define HPDJ_PDM_ERROR_BAD_VALUE                      0x03
#define HPDJ_PDM_ERROR_CANNOT_SET                     0x04
#define HPDJ_PDM_ERROR_OUTOFRANGE                     0x05
#define HPDJ_PDM_ERROR_NOMORE_VALUES                  0x06
/*
 *  Bool Items. Members accessed by the following identifiers take on
 *  TRUE or FALSE values.
 */
#define HPDJ_PDMID_PAGE_BORDERS                       0x00000001
#define HPDJ_PDMID_FLIP_HORIZONTAL                    0x00000002
#define HPDJ_PDMID_ORDERED_PRINTING                   0x00000003
#define HPDJ_PDMID_CAN_DO_BANNER                      0x00000004
#define HPDJ_PDMID_BANNER_SETTING                     0x00000005
#define HPDJ_PDMID_FAX_PHOTOCOPY                      0x00000006
#define HPDJ_PDMID_PRINT_PREVIEW                      0x00000007
#define HPDJ_PDMID_CAN_DO_AUTO_DUPLEX                 0x00000008
#define HPDJ_PDMID_AUTO_DUPLEX_SETTING                0x00000009
/*
 *  Int Items. Members accessed by the following identifiers take
integer
 *     values.
 */
#define HPDJ_PDMID_PAGEMODE                           0x00000100
#define HPDJ_PDMID_PAGECOUNT                          0x00000200
#define HPDJ_PDMID_INTENSITY                          0x00000300
#define HPDJ_PDMID_COLOR_TONE                         0x00000400
#deiine HPDJ_PDMID_BRIGHTNESS                         0x00000500
#define HPDJ_PDMID_SATURATION                         0x00000600
#define HPDJ_PDMID_INK_LEVELS                         0x00000700
#define HPDJ_PDMID_ZOOM_FACTOR                        0x00000D00
#define HPDJ_PDMID_ZOOMSMART_MODE                     0x00000E00
#define HPDJ_PDMID_ZOOMSMART_PHYSICAL_PAPER_SIZE      0x00000F00
#define HPDJ_PDMID_EXTRA_DRYTIME                      0x00001000
/*
 *  Values for PAGEMODE.
 */
#define HPDJ_PDMVALUE_PAGEMODE_NORMAL                 0
#define HPDJ_PDMVALUE_PAGEMODE_NUP                    1
#define HPDJ_PDMVALUE_PAGEMODE_POSTER                 2
/*
 *  Values for ZOOMSMART_MODE.
 */
#define HPDJ_PDMVALUE_ZOOMSMARTMODE_NORMAL            0
#define HPDJ_PDMVALUE_ZOOMSMARTMODE_TARGETPAPERSIZE   1
#define HPDJ_PDMVALUE_ZOOMSMARTMODE_FTTTOPAPER        2
// String Items
#define HPDJ_PDMID_MEDIA_TYPE                         0x00010000
#endif // HPDJPDMA_H
```

We claim:

1. A method for use in printing a print job from an application program on a printer, the printer having associated job settings which include a private portion containing a printer-specific job setting, the method comprising:

providing a non-print driver program interface configured to enable the application program to access the printer-specific job setting in the private portion of the job settings;

from the application program, sending a command to the program interface to perform an operation related to the printer-specific job setting; and performing the operation related to the printer-specific job setting;

wherein the program interface includes an agent configured to transmit commands from the application program to a printer-specific interpreter program containing an identity of the printer-specific job setting in the private portion of the job settings.

2. The method of claim 1, wherein the operation includes retrieving a value of the printer-specific job setting.

3. The method of claim 1, wherein the operation includes setting a value of the printer-specific job setting.

4. The method of claim 1, wherein the job settings include a plurality of printer-specific job settings, and the operation includes enumerating the plurality of printer-specific job settings and corresponding values associated therewith.

5. The method of claim 1, wherein the printer-specific job setting is accessed without user selection via a dialogue box.

6. The method of claim 1, wherein the program interface includes an API, and wherein sending a command to the interface includes making a function call to the API.

7. The method of claim 6, wherein the program interface further includes a command buffer positioned within the private portion of the job settings, and the application program is configured to send commands to the command buffer by making a function call to the API.

8. The method of claim 1, wherein the job settings are included within a DEVMODE data structure.

9. A method for accessing a printer-specific setting in a private portion of a DEVMODE instance from an application program in a WINDOWS operating environment, the method comprising:

provid ing a DEVMODE structure for a selected printer, the DEVMODE structure including a command buffer;

from the application program, creating an instance of the DEVMODE structure relating to a current print job;

from the application program, setting a command within the command buffer of the DEVMODE instance, the command being to perform an operation related to the printer-specific setting; and executing the command.

10. The method of claim 9, wherein the command buffer is located within the private portion of the DEVMODE structure.

11. The method of claim 10, wherein the command buffer is offset from an end of a public portion of the DEVMODE structure.

12. The method of claim 11, further comprising retrieving a command buffer offset indicating a distance from the end of the public portion of the DEVMODE structure.

13. The method of claim 12, further comprising retrieving a size of the public DEVMODE.

14. The method of claim 13, further comprising calculating an address of the command buffer based upon the command buffer offset and the size of the public DEVMODE.

15. The method of claim 14, further comprising verifying the validity of the command buffer address.

16. The method of claim 15, wherein verifying includes checking a signature of the command buffer.

17. The method of claim 9, wherein the command is an instruction to retrieve the value of a parameter contained within the private portion of the DEVMODE.

18. The method of claim 9, wherein the command is an instruction to set a value of a parameter within the private portion of the DEVMODE.

19. The method of claim 9, wherein the command is an instruction to enumerate a plurality of parameters contained within the private portion of the DEVMODE, and an associated value for each parameter.

20. The method of claim 9, further comprising, after setting the command, sending a request to perform the command to a printer driver associated with a selected printer using an API function call.

21. A method for printing a print job to a printer from an application program in a WINDOWS operating environment, the method comprising:

initializing a DEVMODE for the printer, the DEVMODE including a public portion and a private portion, the private portion containing printer-specific job settings;

querying printer data to determine if the printer supports access to the private portion of the DEVMODE;

if the printer does support access to the private portion of the DEVMODE, retrieving the size of the public portion of the DEVMODE for the selected printer;

retrieving a command buffer offset containing an offset value indicating the distance from the end of the public portion of the DEVMODE at which the command buffer starts;

calculating an address of a command buffer;

verifying validity of the command buffer address;

setting the command buffer to indicate a command; and sending a request to a printer driver associated with the printer to execute the command stored in the command buffer, the request being sent using an API function call.

* * * * *

UNITED STATES PATENT AND TRADEMARK OFFICE
CERTIFICATE OF CORRECTION

PATENT NO. : 6,847,466 B1
DATED : January 25, 2005
INVENTOR(S) : Charles J. Gazdik et al.

It is certified that error appears in the above-identified patent and that said Letters Patent is hereby corrected as shown below:

Column 1,
Line 45, delete "application-programs" and insert therefor -- application programs --.
Line 52, delete "fill" and insert therefor -- full --.
Line 62, delete "printer specific" and insert therefor -- printer-specific --.

Column 2,
Line 17, after "in" delete "printer".
Line 18, before "specific" insert -- printer --.
Line 58, after "instance" insert -- , --.

Column 3,
Line 7, after "to the" insert -- value "4". --.

Column 4,
Line 25, delete "ExtDeviceModeo()" and insert therefor -- ExtDeviceMode() --.
Line 38, delete "portion typically" and insert therefor -- portion 82 typically --.

Column 5,
Line 6, delete "}HPJDPMACCESS," and insert therefor -- } HPDJPDMACCESS, --.

Column 7,
Line 6, delete "Printer Specific" and insert therefor -- Printer-Specific --.
Line 47, delete ""BP Banner Paper"" and insert therefor -- HP Banner Paper --.

Column 10,
Line 34, delete "78" and insert therefor -- 78' --.

Column 13,
Line 33, delete "hprinter;" and insert therefor -- hPrinter; --.

Column 14,
Line 7, delete "If*(Ret !=IDOK)" and insert therefor -- If (1Ret !=IDOK) --.
Line 15, delete "LPMPDJPDMACCESS" and insert therefor
-- LPHPDJPDMACCESS --.
Line 16, delete "(LPMPDJPDMACCESS)" and insert therefor
-- (LPHPDJPDMACCESS) --.
Line 39, delete "=MPDJ_" and insert therefor -- =HPDJ_ --.

Column 16,
Line 16, delete "P'per." and insert therefor -- Paper. --.

UNITED STATES PATENT AND TRADEMARK OFFICE
CERTIFICATE OF CORRECTION

PATENT NO. : 6,847,466 B1
DATED : January 25, 2005
INVENTOR(S) : Charles J. Gazdik et al.

It is certified that error appears in the above-identified patent and that said Letters Patent is hereby corrected as shown below:

Column 18,
Line 57, delete "setting:" and insert therefor -- setting; --.

Signed and Sealed this

Sixth Day of December, 2005

JON W. DUDAS
*Director of the United States Patent and Trademark Office*